March 8, 1938. M. C. REYNOLDS 2,110,384
EGG TREATING METHOD
Filed Jan. 27, 1936
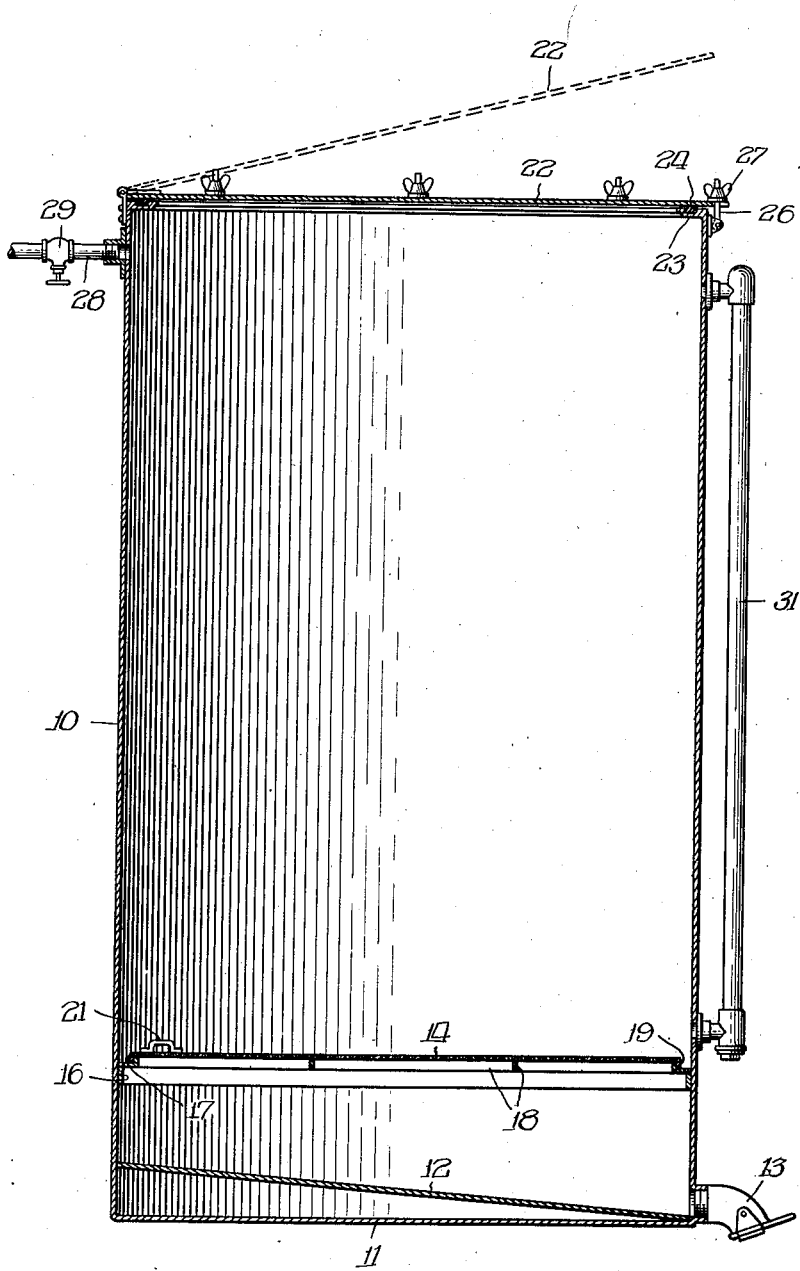
Inventor:
Marvin C. Reynolds,
By McLaughlin & Wattenstein
attys Patented Mar. 8, 1938

2,110,384

UNITED STATES PATENT OFFICE 2,110,384

EGG TREATING METHOD

Marvin C. Reynolds, Chicago, Ill.

Application January 27, 1936, Serial No. 60,911

5 Claims. (Cl. 99—113)

My invention relates to the treatment of eggs in preparation for ordinary use or for drying or canning the same. It relates more in particular to an improved process by means of which the eggs are strained and other advantages secured as will appear from the following description.

In the industries relating to the preparation and use of products prepared from egg material, which may be yolks, whites, or mixed yolks and whites, many different processes have been employed. Experience has taught those skilled in the art that comparatively minor variations in the treatment of egg products often have very significant and important results upon the character of the final egg product produced. For example, the amount and character of agitation to which egg materials are subjected in the course of handling them, particularly whether or not the agitation occurs in the presence of air, often have an important bearing upon the character of the egg product.

It has been suggested in the past to strain eggs by pumping them continuously through a so-called line strainer or filter, a reciprocating piston type of pump, or a rotary "Viking" type of pump being utilized. While certain advantages are obtainable by this method of treatment, there are certain disadvantages inherent in the process and which cannot be overcome with such apparatus.

Accordingly, the principal object of my invention is the provision of an improved process for handling liquid egg material.

Another object is the provision of an improved process for straining liquid egg products, particularly liquid egg whites.

Other objects and features of the invention will be apparent from the consideration of the following detailed description taken with the accompanying drawing wherein the single figure illustrates one general type of apparatus which may be employed in accordance with my present invention.

In general I accomplish the objects of my invention by forcing the liquid egg material supported in a tank or container by means of fluid pressure, through a transversely disposed screen, preferably circular or disk shaped, supported at or near the bottom of the container. Preferably, air or other gas pressure is employed to force the egg material through the screen. By means of this process I secure very definite advantages and improved functions which I shall describe more in detail hereinafter.

In the single figure I show a conventional type of tank 10 generally cylindrical in construction, having a bottom 11 and a false bottom 12 to assure the delivery of material in the tank to a drain spout 13.

Slightly above the bottom 12 I provide a screen 14. This screen is supported in position by suitable means such as shown in the drawing. A ring 16 is brazed or welded to the side walls of the tank. A flanged ring 17 is supported above the ring 16. Cross members 18 have their ends secured to the flanged portion of the ring 17 whereby to support the screen 14 in the manner shown. The screen 14 has an annular flange 19 secured thereto, adapted to engage on the outside of the flange on the ring 17. In this manner a firm support is provided for the screen 14 and it is readily removable for cleaning or the like. A small ring 21 is attached to the screen to facilitate its removal.

The tank is provided with a hinged cover 22. At the top of the tank a flange 23 is provided between which flange and the cover 22 a gasket 24 is compressed when the cover is clamped in position. This produces a substantially air-tight joint. A plurality of suitable locking members is provided. In the drawing I show pin 26 hinged to the top of the tank and adapted to extend into an edge recess of the cover 22. A wing nut 27 is provided to clamp the cover tightly against a washer or gasket. It is understood, of course, that any other quick opening cover attaching means may be employed.

Near the top of the tank I connect a pipe 28 leading from a source of air supply under pressure with a valve 29 for controlling the admission of air to the top of the tank. A sight glass 31 is connected by suitable means to the top and bottom of the tank so that at any time the amount of egg material present in the tank can be determined. This sight glass 31 may, of course, if desired be in the form of a glass panel set directly into the side of the tank. In general, however, a sight glass of the type shown in the drawing is satisfactory. This is similar to the usual water level tubes employed in steam boilers.

The screen 14 may be of several different types and may be either a woven mesh screen or a perforated plate. For egg whites a mesh wire screen having about 40 meshes per inch produces good results. For whole eggs I may employ a perforated plate containing 90 to 100, $\frac{1}{16}$ inch diameter, perforations per square inch.

Before describing the manner in which the tank and screen shown in the drawing are employed, I shall explain briefly the manner in which eggs are handled in conventional practice.

The eggs after candling are broken, the yolks and whites separated, if a separate yolk or white product is to be produced, or the whole egg may be employed if a mixed yolk and white product is to be produced. The egg product is ordinarily packed in a tinned metal can which holds 30 pounds of egg material. After packing in the can the product is frozen and maintained in a frozen condition in a warehouse until ready for use.

Ordinarily, treating materials of various kinds are employed in the egg material such as about 8 to 10 per cent of salt as disclosed in Epstein Patent No. 1,730,879, or an improving substance such as those described in the recently issued patent to Harris et al. No. 2,026,631. These added materials must be thoroughly mixed, dissolved or dispersed in the egg material. In addition, particles of shells that find their way into the egg material, foreign matter which might be introduced, and chalazae should be removed if a good product is to be produced.

One method that has been employed is to pump the egg material continuously through a line strainer to produce a homogeneous product with substantially no bits of shells and the like present, and then to deliver the screened liquid egg product to a mixing and treating tank where the additional material added was incorporated in the previously screened egg material. From this mixing and treating tank the liquid egg material was withdrawn, weighed out in cans and then delivered to the freezing room.

In the use of my present invention, I place approximately 300 pounds of an egg material which has not been previously treated, except possibly with a simple gravity strainer or over a cascade, to remove any large pieces of shell that may be present. This egg material is then treated by the addition thereto of whatever treating material is to be employed, for example 8 to 10 per cent of ordinary sodium chloride. For the purpose of mixing the sodium chloride, I may if desired utilize mixing arms in the tank 10 itself or preliminary mixing of the salt and egg material may be done by hand. Instead of mixing the treating material with the eggs in the tank 10, the treating material may be added before the egg material is delivered to the tank 10. This depends somewhat on the material being introduced and the most convenient arrangement which can be made available for introducing the egg material into the tank 10. For example, the egg material may be introduced first into a storage tank placed above the tank 10 so that the egg material can be run by gravity from the storage tank into tank 10.

The egg material with the treating material present which has been introduced either in the tank 10 or before delivery to tank 10 is now forced out of the tank 10 by closing the cover 22 and introducing air through the air line 28. Ordinarily not more than about 40 pounds of air is necessary above the egg material to have sufficient fluid piston effect to expel the egg material. One advantage is that the egg material may be weighed out directly, the valve attached to the drain spout 13 being opened or closed at will. During the time that the drain spout is closed the pressure above the egg material remains static and no harm will result such as would take place if a positive acting pump were being employed to force the egg material through the screen.

The screen employed in the bottom of the container quickly builds up a mat which improves the straining action. The material which is being incorporated with the egg material is not readily passed through the screen until it is in a finely divided or dissolved condition. Accordingly, the use of this method causes a very much better dispersion of the treating material throughout the egg material and a more homogeneous and uniform product is produced.

An additional advantage of the use of my present method is that much less agitation of the eggs takes place than in other suggested screening methods and less air is emulsified with the egg material. I have found that with a large batch of eggs present in the tank 10, the relative surface in contact with the air under pressure is very small. Moreover, that surface is not broken up and there is no opportunity of entrapping air mechanically. The result is quite surprising in that even after comparatively long standing sufficient air is not introduced into the eggs to cause any noticeable foaming after the release of pressure as, for example, when the eggs are delivered to a standard can. In ordinary practice, however, the eggs are in contact with air under pressure, of course, only a relatively short time.

The use of a circular or disk like screen has very great advantages in that it is easily removed and very easily cleaned. While my present invention does not lend itself to continuous operation, but rather requires "batch operation", it offers advantages not possessed by methods suggested for continuous operation. This is particularly true since continuous operation is not satisfactory in any event when a definite amount of addition substance is to be introduced into the eggs.

The screen employed is disposed transversely of the tank, as distinguished from a line strainer, for example, which is disposed longitudinally of a conduit or container in which it is housed. The strainer which I employ has an effective filtering surface either slightly less than, or not appreciably greater than, the cross sectional area of the tank, although it may be made conical or convex, or have some shape other than flat, in order to increase its strength, if desired.

Where I refer to the use of air pressure, it is to be understood that I wish to include the use of any unobjectionable difficultly water-soluble gas, such as nitrogen, hydrogen, etc., and the term "gas" is used in the claims to include either air or such a gas.

It will be understood, of course, that I employ the term "pressure" in a relative sense; that is to say, there should be a pressure differential between the gas (air) above the eggs, and at the discharge. Whether pressure above atmospheric be employed above the egg mass, a partial vacuum at the outlet, or a combination of the two, is of course immaterial.

I have described my invention in some considerable detail to assist those skilled in the art in practicing the same, but I do not limit myself to the specific details described, the invention being limited only by the scope of the claims.

What I claim as new and desire to protect by Letters Patent of the United States is:

1. The method of treating liquid egg material, which comprises introducing the liquid egg material into a relatively large capacity tank provided with a relatively large area fine mesh screen therein, closing the top of said tank, and introducing gas under pressure into said tank above the level of said egg material, whereby to force the said egg material through said screen.

2. The method defined in claim 1, wherein egg modifying material is incorporated in said egg material while in said tank and before the introducing of gas under pressure therein.

3. A method of treating liquid egg meats which comprises providing a body of said liquid egg meats in a container, said body having substantial area and thickness, and applying pressure of a gas directly against the surface of said liquid egg meats to force them through a fine wire filter without foaming and whereby strings, chalazae, and foreign matter are removed from the liquid egg meats and the latter are thinned out and rendered homogeneous.

4. A method of treating liquid egg meats which comprises providing a container having a substantial depth and cross sectional area and having a fine mesh filter substantially coextensive with the cross sectional area of said container and disposed near the bottom of said container, filling said container with liquid egg meats to a substantial height above said filter, and then applying pressure of a gas directly against the surface of said liquid egg meats to force them downwardly through said filter without foaming and whereby strings, chalazae and foreign matter are removed from the liquid egg meats and the latter are thinned out and rendered homogeneous.

5. The method defined in claim 4, wherein the liquid egg meats treated consist of egg whites.

MARVIN C. REYNOLDS.